United States Patent
Haggard

[11] Patent Number: 6,050,524
[45] Date of Patent: Apr. 18, 2000

[54] PARACHUTE SOFT LANDING SYSTEM

[76] Inventor: Roy A. Haggard, 29335 Jarrell Ct., Nuevo, Calif. 92567

[21] Appl. No.: 08/994,269

[22] Filed: Dec. 29, 1997

[51] Int. Cl.[7] .................................................. B64D 17/30
[52] U.S. Cl. ........................................................ 244/151 A
[58] Field of Search ............................ 244/17.13, 138 R, 244/152; 60/39.47

[56] References Cited

U.S. PATENT DOCUMENTS

| | | | |
|---|---|---|---|
| 2,414,284 | 1/1947 | Bacon | 244/138 R |
| 2,483,088 | 9/1949 | De Haven | 60/39.47 |
| 2,560,445 | 7/1951 | Jackson | 244/138 R |
| 2,730,317 | 1/1956 | Onanian | 244/152 |
| 3,109,615 | 11/1963 | Fritz | 244/138 R |
| 3,146,975 | 9/1964 | DeLamaire | 244/138 R |
| 3,156,442 | 11/1964 | Pourchet | 244/138 R |
| 3,209,864 | 10/1965 | Boyd | 244/138 R |
| 3,387,805 | 6/1968 | Barnett et al. | 244/138 R |
| 4,333,621 | 6/1982 | Acker | 244/138 R |
| 4,695,013 | 9/1987 | Trampnau | 244/17.13 |

*Primary Examiner*—Charles T. Jordan
*Assistant Examiner*—Charles R. Ducker, Jr.
*Attorney, Agent, or Firm*—Frank C. Price

[57] ABSTRACT

The ground impact velocity of a parachutist is reduced by a single, length-shortening, retraction device mounted between the parachute riser webbings. The gas generator-activated retraction device is activated by a ground proximity device based on electromagnetic or ultrsonic radiation reflected from the ground. The retraction device is fully integrated, eliminating any need for wires or connectors. An alternative design for the ground sensor is a wire-dangled mechanical ground sensor. The system allows steering of the descending parachute.

2 Claims, 3 Drawing Sheets

PARACHUTE SOFT LANDING SYSTEM

BACKGROUND

This invention applies to parachutes for any use which have controls influencing speed of descent and trajectory. Guided parachutes and those which can reduce their impact velocity are known. De Haven, U.S. Pat. No. 2,483,088 has a system for reducing the landing impact of a parachute for a person. Two risers have been used to allow a parachutist to steer. Two retraction devices have been connected, one each, to the risers. These operate just before landing to soften the landing impact. Reliable and accurate means for activating retraction devices at a particular height above the ground are known. A design of rigging to allow steering and concommitantly to incorporate a singular mechanism for reducing the the descent velcity at impact with the ground is not known. This invention is a parachute system that allows steering during descent and reduced ground impact velocity with that velocity reduction being achieved by a singular mechanism. This invention has a completely integrated system including retractor, pressurizing device and ground sensor.

BRIEF SUMMARY OF THE INVENTION

With this invention the parachute suspension lines gather into two groups, each connected to one of two risers which lead down to the harness on the parachutist. Lines lead from the lower part of each riser to the parachutist's hands for steering or alternatively the risers can be pulled on directly for steering. In between the two risers and more or less parallel to them is a retraction or length-shortening device. At the upper end and at the lower end of the retraction device it is connected in a "Y" harness to each of the risers. The use of only one retaction device and the method of connection between the two risers is the essence of this invention. Also, the retraction device includes (1) an integrated sensor and (2) robust, solid-state components which determine the elevation of activation for the retraction. The sensor can be based on millimeter wave, microwave or ultrasonic wave propagation with reflection from the ground. The integrated design eliminates wiring and connectors which might be vulnerable to the environment of use. A ground feeler probe dangled below the parachutist can also be used.

With the incorporation of this invention a parachute can be designed for faster descent velocity without increased landing impact. The parachute can still be steered. The retraction mechanism senses the height above the ground and activates at exactly the right moment before impact. The total system can be produced at less cost than that for a system which uses two retraction devices, one on each riser.

The sensor/signal device for activating the retraction mechanism can be a state of the art proximity sensor tuned or aimed to ignore the presence of the parachutist between it and the ground or it can be a ground-impacting sensor dangled below the parachutist at a proper distance. The proximity sensor might use the sensing of electromagnetic transmission which is generated at the parachute system and reflected from the ground. The proximity sensor might use the sensing of generated ultrasonic sound reflected from the ground.

DETAILED DESCRIPTION OF THE INVENTION

Figure 1:
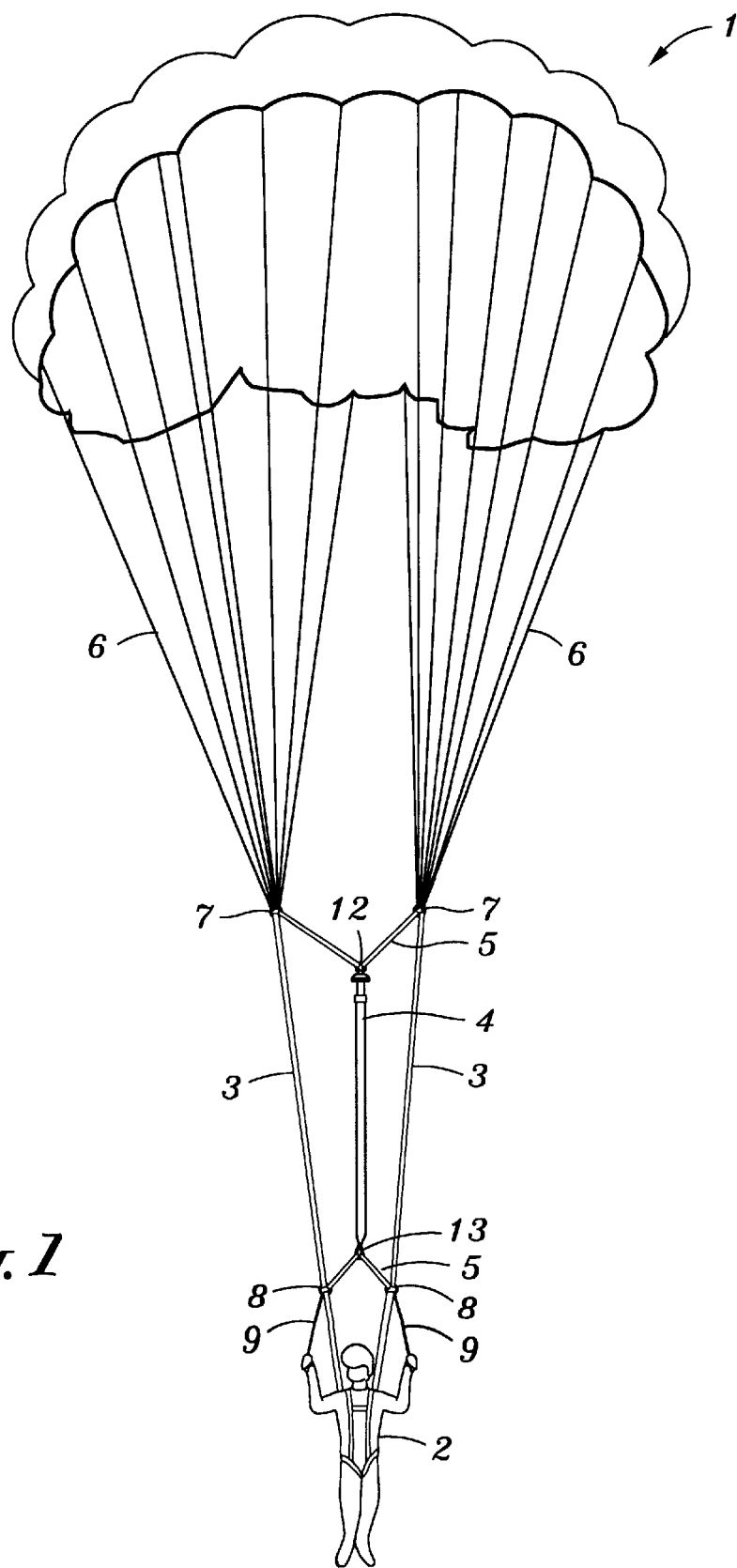
FIG. 1 shows an elevation view of a descending parachutist in his parachute.

FIG. 1 shows a parachute 1 with suspension lines 6 extending in two groups and connected with risers 3 at points 7. The risers 3 extend downward to terminate on the parachutist's harness 2. At points 8 on the risers 3, guiding lines 9 are attached which the parachutist grasps to steer the parachute 1. A retraction element 4 has Y bridles 5 at either end attaching the retraction element 4 to the top of the risers 3 at 7 and near the bottom of the risers 3 at points 8 where the guide lines 9 attach to the risers 3. The Y bridles are formed at points 12 and 13 on the extremities of the retraction device 4.

Just before the parachutist's feet reach the ground the retraction element 4 makes its stroke tending to lift the parachutist upward relative to the parachute canopy. The actual net effect is to reduce the descent velocity of the parachutist just as his feet are about to touch the ground.

Figure 2:
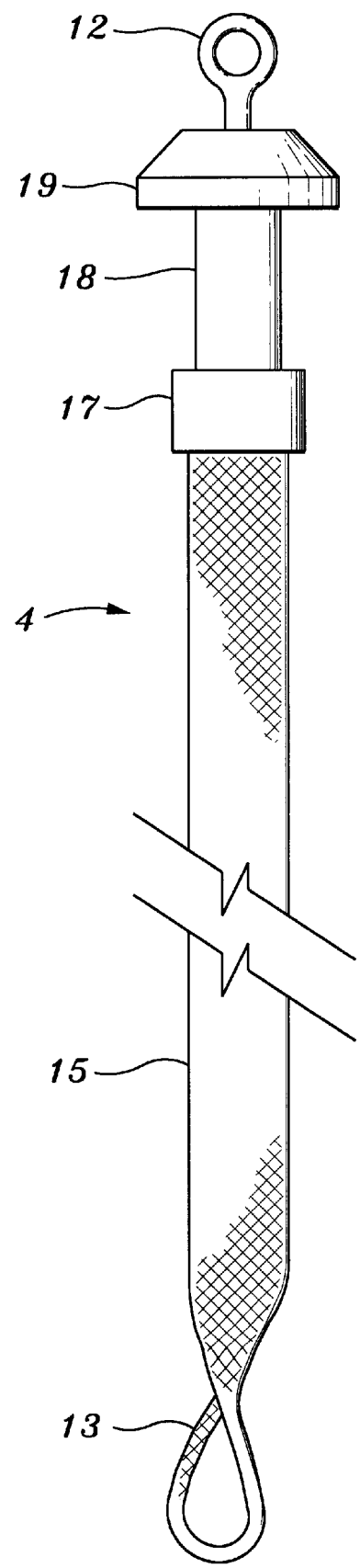
FIG. 2 shows the details of the retraction device.

The retraction element 4 in FIG. 2 includes the braided fiber tube 15 covering a bladder. When the bladder is expanded the nature of the tube 15 is to expand and shrink in length. The bladder and braided fiber tube are closed off at the lower end with a connection loop 13 at the lower Y harness. The upper end of the bladder and woven cover have an end-effect coupling 17 where the bladder-expanding gas generator 18 is attached. The top of the gas generator 18 attaches to a container 19, the top of which has a connecting means 12 for the upper Y harness 5 in FIG. 1. The container 19 holds the triggering mechanism for the gas generator 18 and it can also contain a transmitting proximity sensor, sensing the approaching ground of the descending parachute. The proximity sensor would signal the triggering mechanism.

Figure 3:
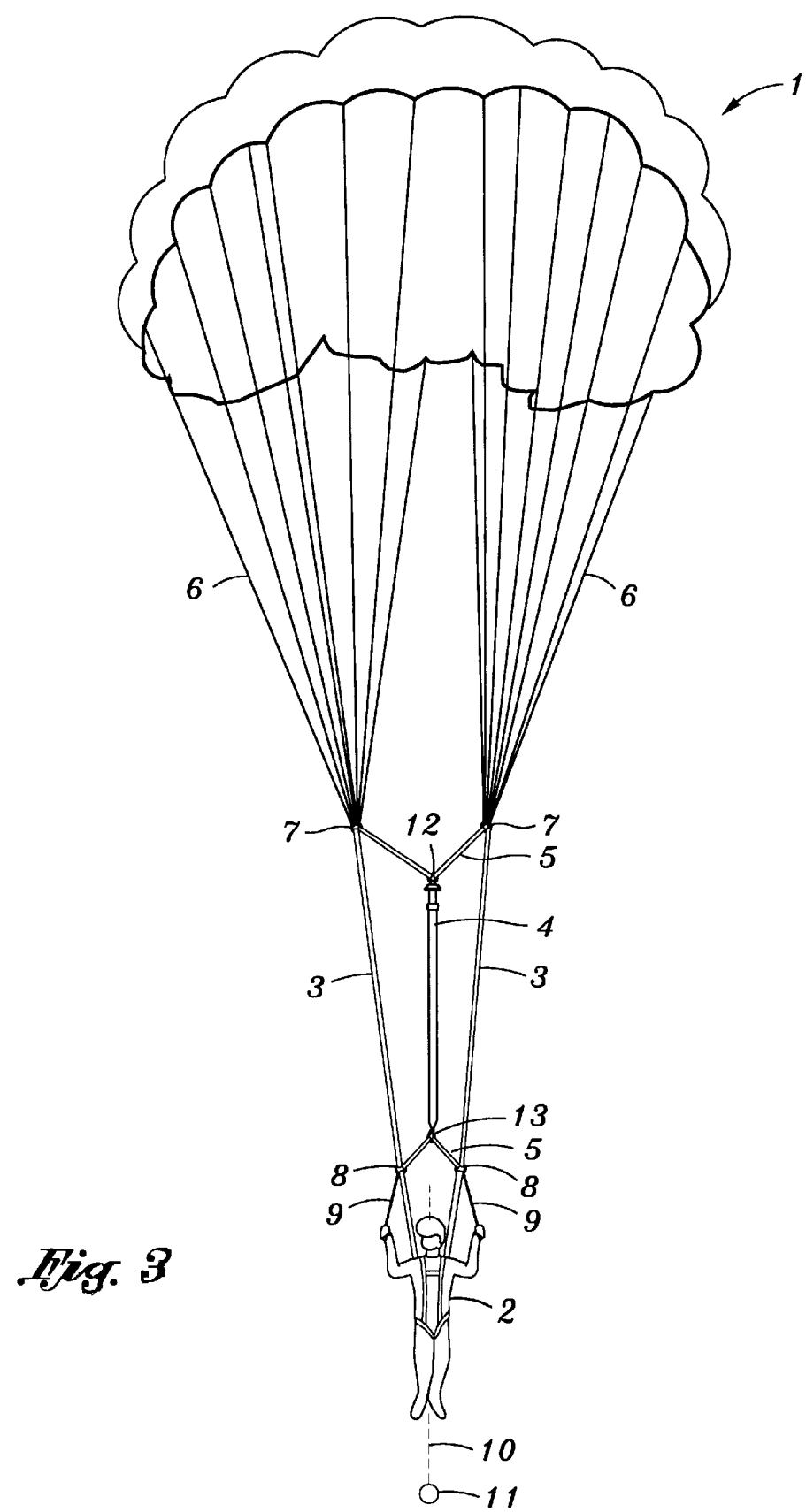
FIG. 3 shows the invention with a dangling ground sensor.

Instead of a transmitting sensor, the signal for the triggering mechanism could originate in a wired ground feeler dangled below the parachutist. In FIG. 3 is shown the concept of a ground feeler 11 dangled by a line 10. The ground feeler triggers the retraction mechanism 4 when the parachutist is at the design altitude for optimum effect on velocity reduction as the parachutist impacts the ground. This is an alternative to the preferred embodiment wherein the total retraction system is integrated in one package. The proximity sensor, trigger and gas generator could be at either end of the retracting tube, depending upon the method of discriminating the ground from the parachute.

I claim:

1. A parachute landing system comprising:
   a parachute, two risers, a retraction device, an upper Y-bridle, a lower Y-bridle, and a harness; said parachute having suspension lines, half of said suspension lines connecting to each said riser, the lower end of each said riser connecting to said harness, said upper Y-bridle connecting the upper end of said retraction device to the upper end of each said riser, the said lower Y-bridle connecting the lower end of said retraction device to the lower ends of each said riser, said risers allowing the parachutist to steer the parachute, and said retraction device shortening rapidly prior to landing to reduce landing velocity.

2. The reaction device of claim 1 also comprising:
   a bladder and a braided tubular cover designed to become shorter when said bladder is inflated, a gas generator for inflating said bladder, a sensor of distance and an ignition system combined to activate said generator at a specified distance from an approaching surface.

* * * * *